Aug. 15, 1967

R. D. KOPA 3,336,017

COMPOUND CYCLONIC FLOW INDUCTOR AND IMPROVED
CARBURETOR EMBODYING SAME

Filed Jan. 12, 1965

INVENTOR.
RICHARD D. KOPA
BY Forrest J. Lilly
ATTORNEY

Aug. 15, 1967 R. D. KOPA 3,336,017
COMPOUND CYCLONIC FLOW INDUCTOR AND IMPROVED
CARBURETOR EMBODYING SAME
Filed Jan. 12, 1965
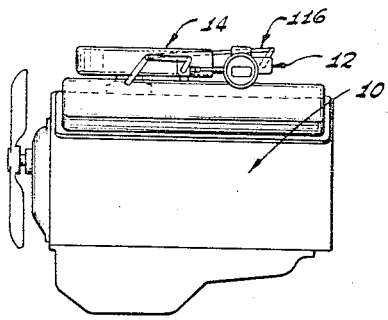
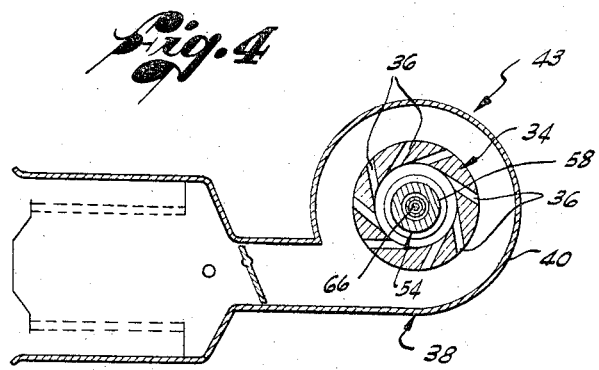
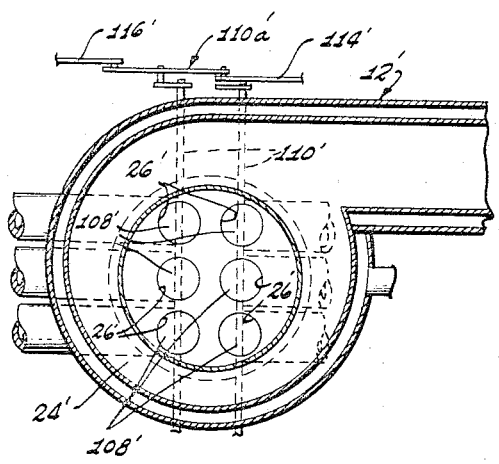
INVENTOR.
RICHARD D. KOPA
BY Forrest J. Lilly
ATTORNEY

United States Patent Office 3,336,017
Patented Aug. 15, 1967

3,336,017
COMPOUND CYCLONIC FLOW INDUCTOR AND IMPROVED CARBURETOR EMBODYING SAME
Richard D. Kopa, Van Nuys, Calif., assignor to The Regents of The University of California, a corporation of California
Filed Jan. 12, 1965, Ser. No. 424,970
6 Claims. (Cl. 261—128)

This invention relates generally to the art of inducing cyclonic flow of a fluid and has more particular reference to a compound cyclonic flow inductor for fluids and to an improved carburetor embodying the inductor.

In its broader aspects, the present invention is concerned with a compound cyclonic flow inductor for inducing compound cyclonic flow of a fluid, that is, cyclonic flow having a first rotational component about an axis and along a direction line which curves around the axis, and a second rotational component about said direction line. Such compound cyclonic flow may be desired for any one or more of several different reasons, to wit, increasing the effective length of the flow path of the fluid through the inductor, increasing the residence time of the fluid in the inductor, subjecting the fluid to centrifugal action for the purpose of centrifugally separating fluid components of different densities, and homogeneously intermixing the fluid with one or more additional fluids. A more limited aspect of the invention is concerned with an improved carburetor, for internal combustion engines, which utilizes the present compound cyclonic flow inductor to achieve improved carburetion and a resultant, substantial reduction in certain contaminants or air pollutants normally present in the exhaust gas emissions from internal combustion engines. The cyclonic flow inductor is disclosed herein in connection with its use in the improved carburetor.

In recent years, air pollution has become a major problem, and the subject of numerous research programs, throughout the world. The primary reason for this concentrated effort in the area of air pollution is the detrimental effect of such air pollution on human health. As a result of the many research programs which have been conducted in the past and are currently in progress, it is now known that the exhaust gas emissions from internal combustion engines, particularly gasoline powered motor vehicle engines, constitute a major source of air pollution. For instance, estimates based on the extrapolation of air pollution data obtained from extensive studies in the Los Angeles area of California have yielded the following figures for the nationwide annual discharge of contaminants into the atmosphere from gasoline powered vehicles:

| | Tons |
|---|---|
| Carbon monoxide | 90,000,000 |
| Hydrocarbons | 12,000,000 |
| Nitrogen oxides | 4,500,000 to 13,500,000 |
| Aldehydes | 150,000 |
| Sulfur compounds | 150,000 to 300,000 |
| Organic acids | 60,000 |
| Ammonia | 60,000 |
| Solids | 9,000 |

It is apparent from the above data that the three major contaminants present in the exhaust gas emissions from gasoline powered motor vehicle engines are carbon monoxide, hydrocarbons, and nitrogen oxides. Accordingly, a reduction in these three contaminants would constitute a highly important and beneficial advance in the eventual conquest of air pollution.

Prior and current attempts to conquer harmful exhaust gas emissions involve various techniques which may be generally classified as follows:

I. Exhaust emission control
    (A) Engine operation control
        (1) Improved carburetion
    (B) Exhaust control
    (C) Fuel modification
II. Blow-by control
III. Non-exhaust emission control The invention disclosed in my copending application, Ser. No. 345,881, filed Feb. 19, 1964, and entitled, Fuel Atomizing Carburetors, proposes certain new and unique carburetion techniques which are effective to substantially reduce the air contaminants, particularly the three major contaminants just listed, which are present in exhaust gas emissions. More specifically, my prior invention, just referred to, relates to improved fuel atomizing carburetors which utilize two known techniques for reducing exhaust gas contaminants. One of these techniques is that of introducing exhaust gas, or other inert fluid, either liquid or gaseous, into the air-fuel mixture entering the engine to reduce the peak combustion temperature of the mixture and, thereby, the formation of nitrogen oxides. The second technique is that of effecting substantially total vaporization of the fuel and substantially complete homogeneous intermixing of the fuel vapor, induction air, and recycled exhaust gas in such manner as to permit engine operation at a more lean air-fuel ratio and thereby achieve more complete combustion of the hydrocarbons in the fuel and reduce the formation of carbon monoxide. One important aspect of this invention is concerned with improving on the carburetors disclosed in my aforesaid copending application to achieve more complete vaporization of the fuel and more complete homogeneous intermixing of the fuel vapor, induction air, and exhaust gas than is achieved in the carburetors of my copending application.

To enable a more complete understanding of this aspect of the invention, there is presented below a brief discussion of the mechanics of contaminant formation in a gasoline engine utilizing conventional carburetion. It has long been recognized that a conventional carburetor is ineffective to deliver to the engine cylinders a completely homogeneous air-fuel mixture. This defect of standard carburetors stems from two basic causes. First, conventional carburetors are ineffective to produce total vaporization of the fuel. Secondly, conventional carburetors are ineffective to produce complete homogeneous intermixing of the fuel vapor that is formed with the induction air. Those conventional carburetors which are equipped with means for recycling exhaust gas into the induction air for the purpose of reducing the formation of nitrogen oxides are further defective in that they do not cause complete homogeneous intermixing of the fuel vapor, induction air, and the recirculated exhaust gas. Thus, if the air-fuel mixture approaching the outlet of a conventional carburetor is closely examined, it will be found to contain unvaporized fuel droplets, as well as fuel vapor and induction air which are not completely homogeneously intermixed. Some of the fuel droplets present in the air-fuel mixture settle out on the wall of the carburetor and form a film of fuel which flows along the carburetor wall onto the wall of the intake manifold, where the fuel is vaporized by the elevated temperatures existing in the manifold. The fuel vaporization which occurs in the intake manifold, however is not uniform, due primarily to the pulsating air flow in the manifold which results from sequential opening of the engine intake valves. This non-uniform fuel vaporization in the intake manifold, coupled with the partial homogeneous intermixing of the induction air and fuel vapor which occurs in the carburetor, results in an uneven distribution of fuel to the engine cylinders, that is, in the delivery to the cylinders of an air-fuel mixture whose effective air-fuel ratio varies from cylinder to cylinder and varies from cycle to cycle at each cylinder for a given throttle setting.

Because of this non-uniform fuel distribution to the engine cylinders, a conventional carburetor must be adjusted to a slightly richer air-fuel mixture than is theoretically necessary for satisfactory engine operation in order to assure the delivery of sufficient fuel to all of the cylinders irrespective of the fluctuations in the effective air-fuel ratio of the air-fuel mixture at the intake ports of the respective cylinders. For example, the stoichiometric air-fuel ratio for gasoline is 15:1. Actually, it is preferable to operate a gasoline engine at an air-fuel ratio which is slightly more lean than the stoichiometric ratio in order to provide excess oxygen and thereby assure complete combustion of the hydrocarbons. A conventional carburetor, on the other hand, must be set for an air-fuel ratio in the range of 14:1 to 12:1. At these relatively rich air-fuel ratios, there is insufficient oxygen present in the air-fuel mixture to effect complete combustion of the fuel. As a result, the exhaust from the cylinders contains a high percentage of unburned hydrocarbons and carbon monoxide.

It is apparent at this point, therefore, that the emission of unburned hydrocarbons and carbon monoxide from a gasoline engine may be reduced by operating the engine at a relatively high air-fuel ratio, preferably slightly in excess of the stoichiometric ratio. It is further apparent, however, that satisfactory engine operation at such lean air-fuel ratios requires completely uniform fuel distribution to all of the engine cylinders. Such uniform fuel distribution, in turn, requires total vaporization of the fuel in the carburetor and complete homogeneous intermixing of the fuel vapor and the induction air, such that no unvaporized fuel emerges from the carburetor, either by flow along the carburetor walls or by entrainment in the air-fuel mixture, and no fluctuations in the effective air-fuel ratio of the emerging air-fuel mixture occur, for a particular throttle setting, due to incomplete homogeneous intermixing of the fuel vapor and induction air.

As mentioned earlier, those conventional carburetors which utilize the recirculation of exhaust gas to reduce the formation of nitrogen oxides, in addition to being deficient because of their inability to provide uniform fuel distribution to all of the engine cylinders, are further deficient for the reason that they are incapable of effecting complete homogeneous intermixing of the air-fuel mixture with the recirculated exhaust gas. The reasons underlying the effectiveness of exhaust gas recirculation in reducing the formation of nitrogen oxides are known in the art and discussed in some detail in my aforementioned copending application. Accordingly, such reasons will not be repeated in this application. While the technique of introducing an inert fluid, such as exhaust gas, into the air-fuel mixture entering an engine, for the purpose of reducing the formation of nitrogen oxides, is not new, it was impossible, prior to the invention disclosed in my aforementioned copending application, to utilize this technique and still attain satisfactory engine operation. This is due to the above-stated inability of conventional carburetors to achieve complete homogeneous intermixing of the air-fuel-exhaust gas mixture. Such incomplete homogeneous intermixing of the recirculated exhaust gas with the air-fuel mixture results in so-called power surging of the engine for the reason that at given time some cylinders receive a higher concentration of exhaust gas than the other cylinders.

The carburetors disclosed in my aforementioned copending application improve on the prior art carburetors by achieving more complete vaporization of the fuel in the carburetor and more thorough homogeneous intermixing of the fuel vapor, induction air, and recirculated exhaust gas, thereby to achieve more uniform fuel and exhaust gas distribution to the engine cylinders. This, in turn, permits satisfactory engine operation at a more lean air-fuel ratio and thereby accomplishes more complete combustion in the engine cylinders and a corresponding reduction in the objectionable exhaust gas contaminants.

The present invention provides a carburetor which is further improved in the same areas, to wit, in the areas of total fuel vaporization and complete homogeneous intermixing of the fuel vapor, induction air, and recirculated exhaust gas. According to the invention, this highly desirable and beneficial end is achieved by the utilization of the present compound cyclonic flow inductor in the carburetor. This cyclonic flow inductor is effective to (1) drive the unvaporized fuel droplets in the air-fuel mixture outwardly, by centrifugal action, against the walls of the carburetor housing which are heated to effect total vaporization of the fuel in the carburetor, (2) to swirl the fuel vapor, induction air, and recirculated exhaust gas in a unique compound cyclonic motion, thereby to achieve complete homogeneous intermixing of the fuel vapor, induction air, and exhaust gas, and (3) to increase the effective length of the flow path of the mixture through the carburetor and hence the residence time of the mixture in the carburetor, thereby to provide a longer period of time for the fuel to become totally vaporized and the fuel vapor, induction air, and exhaust gas to become completely homogeneously intermixed. These beneficial actions of the compound cyclonic flow inductor are aided by the utilization of a fuel atomizing nozzle, of the kind disclosed in my copending application, for injecting finely atomized fuel into the entering air stream in a condition which promotes rapid vaporization of the fuel.

Another important aspect of the invention is concerned with a unique configuration of the carburetor, whereby the latter is adapted for mounting on a conventional internal combustion engine, in place of the standard carburetor, without modification of the engine. A further highly important aspect of the invention is concerned with a unique arrangement of the carburetor, whereby the latter may be designed for use as a single barrel carburetor, or a multiple barrel carburetor, for delivering an air-fuel mixture directly to groups of engine cylinders or to individual engine cylinders.

It is a general object of the present invention, therefore, to provide a novel compound cyclonic flow inductor for inducing compound cyclonic flow of a fluid.

Another object of the invention is to provide an improved carburetor embodying the compound cyclonic flow inductor.

Yet another object of the invention is to provide an improved carburetor which is effective to achieve substantially total vaporization of the fuel in the carburetor and substantially complete homogeneous intermixing of the fuel, induction air, and exhaust gas, when the latter is recycled to reduce the formation of nitrogen oxides.

A further object of the invention is to provide an improved carburetor which is adapted to be mounted on an internal combustion engine, in place of a standard carburetor, without modification of the engine.

Yet a further object of the invention is to provide an improved carburetor which may be adapted to single barrel or multiple barrel operation.

A still further object of the invention is to provide a compound cyclonic flow inductor and an improved carburetor embodying the inductor which are relatively simple in construction, economical to manufacture, reliable in operation, and otherwise ideally suited to their intended purposes.

With these and other objects in view, the invention consists in the construction, arrangement, and combination of the various parts of the invention, whereby the objects contemplated are attained, as hereinafter set forth, pointed out in the appended claims, and illustrated in the accompanying drawings.

Briefly, the objects of the invention are attained by providing a compound cyclonic flow inductor equipped with an outlet chamber of generally circular, transverse cross section and an inlet chamber of generally circular, transverse cross section extending tangentially from an opening at one end to the outlet chamber, adjacent one end of the latter chamber. The inductor is equipped with a fluid inlet in the opposite end of the inlet chamber and with a fluid outlet in the opposite end of the outlet chamber. The fluid inlet is arranged to impart a simple cyclonic motion to the induction fluid as the latter flows through the inlet chamber, which motion has a linear component parallel to the axis of the inlet chamber and a rotational component about the latter axis. During its flow through the outlet chamber, the fluid undergoes a compound cyclonic motion having a first rotational component about the axis of the outlet chamber and along a direction line which curves around the latter axis, and a second rotational component about said direction line.

In the improved carburetor of the invention, this compound cyclonic flow inductor is utilized as a mixing chamber into which atomized fuel, induction air, and, if desired, exhaust gas are introduced and which is effective to impart a compound cyclonic motion to these several fluids. The cyclonic motion of the fluid mass drives unvaporized fuel droplets radially out, by centrifugal action, against the wall of the carburetor housing which is heated by exhaust gas to effect total vaporization of the fuel. The cyclonic motion of the fluid mass is also effective to produce homogeneous intermixing of the fuel vapor, induction air, and exhaust gas. A unique and important feature of the invention resides in the provision of a thermostatically controlled valve for regulating the exhaust gas heating of the mixing chamber wall in such a way as to maintain the wall at the proper temperature for optimum engine operation.

The invention will now be described in greater detail by reference to the accompanying drawings, wherein:

FIG. 1 is a vertical section through a carburetor embodying the present compound cyclonic flow inductor and illustrating the carburetor installed on the intake manifold of an internal combustion engine;

FIG. 2 is a horizontal section through the carburetor;

FIG. 3 is a side elevation, on reduced scale, showing the carburetor installed on an internal combustion engine;

FIG. 4 is a section taken on line 4—4 in FIG. 2; and

FIG. 5 is a partial horizontal section through a multiple barrel carburetor according to the invention.

In FIG. 3 of these drawings, there is illustrated an internal combustion engine 10 which, in this disclosure, is assumed to be a gasoline powered engine of a motor vehicle. Mounted on this engine is an improved carburetor 12 according to this invention. Embodied in the carburetor 12 is a compound cyclonic flow inductor 14 according to the invention which forms the mixing chamber of the carburetor. This compound cyclonic flow inductor will be described first by reference to FIGS. 1, 2, 4 and 5.

Inductor 14 comprises a housing 16 having an outlet chamber 18 of circular transverse cross section. This outlet chamber is defined by a generally cylindrical side wall 20 and end walls 22 and 24. End wall 22 completely closes the adjacent end of the outlet chamber 18. The end wall 24 has a circular outlet opening 26 and is conically tapered, whereby as it approaches the outlet 26, the latter wall recedes axially away from the opposite end wall 22 of the outlet chamber. Extending generally tangentially from the outlet chamber 18, and opening at one end to the interior of the latter chamber, adjacent the end thereof remote from the outlet 26, is an inlet chamber 28 of generally circular transverse cross section. The inlet chamber 28 has a generally cylindrical side wall 30 and an end wall 32 which closes the end of the inlet chamber remote from the outlet chamber 18. Adjacent the end wall 32, the inlet chamber 28 is radially enlarged to define a swirl cage 34 having a number of inlet openings 36 which open generally tangentially into the interior of the inlet chamber. Mounted on the inlet chamber 28, in surrounding relation to the swirl cage 34, is an intake housing 38. This housing has a cylindrical side wall 40 which encircles and is radially spaced from the swirl cage and annular end walls 42 which join the wall 40 to the wall 30 of the inlet chamber 28. Extending generally tangentially from the intake housing 38 is an intake duct 43 having an intake passage 44. At this point, it is important to note that the intake passage 44 opens into the interior of the intake housing 38 in the same tangential direction as the inlets 36 open to the interior of the inlet chamber 28. Axially mounted in the outlet chamber 18, in spaced relation to the end walls 22 and 24 of the latter chamber, is a cylindrical baffle 46.

Assume now that a fluid, such as air, is induced to flow through the inductor 14 in such manner that the air enters the inductor through the intake passage 44. The inlet air enters the intake housing 38 tangentially and thus swirls about the interior of the housing. The air flows from the intake housing into the inlet chamber 28 through the tangential inlets 36 in the swirl cage 34 and thus swirls about the interior of the inlet chamber. The similar tangential directions, just referred to, of the intake passage 44 and the inlets 36 promote smooth and uniform flow of air from the intake housing 38 into the inlet chamber 28 through the several inlets 36, whereby the air enters the inlet chamber tangentially and substantially uniformly about the entire circumference of the latter chamber. At this point, therefore, it is apparent that the swirl cage 34 is effective to induce swirling or cyclonic flow of the air through the inlet chamber in such manner that the air undergoes a simple cyclonic motion having a linear component parallel to the axis 48 of the latter chamber and a rotational component about the axis.

The swirling mass of induction air emerges from the inlet chamber 28 tangentially into the outlet chamber 18, and into the ring-shaped duct $r$ between the cylindrical side wall 20 of the latter chamber and the internal baffle 46 in the latter chamber. This tangential entrance of the swirling mass of air from the inlet chamber into the outlet chamber induces circular flow of the air about the axis 50 of the latter chamber. Accordingly, as it flows through the outlet chamber, the swirling mass of air from the inlet chamber undergoes a compound whirling or cyclonic motion, represented in FIG. 1 by the circular arrows $c$, and having a first rotational component about the axis 50 of the outlet chamber and along a direction line 52 which curves around the latter axis, and a second rotational component about the direction line. A portion of the swirling mass of air in the outlet chamber 18 flows around and toward the upper end of the chamber baffle 46, then radially in toward the axis 50 of the chamber, between the end wall 22 and the upper end of the baffle, and finally axially through the baffle to the outlet 26. The remaining portion of the swirling mass in the outlet chamber flows around and toward the lower end of the baffle 46, and then radially in toward the axis 50, between the end wall 24 and the lower end of the baffle, to the outlet 26. These flows are generally indicated by the arrows $o$ and $o'$. At this point, therefore, it is apparent that the compound cyclonic flow inductor 14 of the invention is effective to induce, in the inlet chamber 28, simple cyclonic flow of the induction air entering through the chamber inlets 36, and, in the outlet chamber 18, compound cyclonic flow of the air.

As mentioned earlier, such compound cyclonic flow of a fluid may be desired for any one or more of several reasons, to wit, to increase the effective length of the flow path of the fluid through the inductor, to increase the residence time of the fluid in the inductor, to subject the fluid to centrifugal action for the purpose of separating fluid components of different densities, and to homogeneously intermix the fluid with one or more additional fluids. In the illustrated application of the inductor 14 in the carburetor 12, all of these results of cyclonic flow are utilized. To the end of a more thorough understanding of this aspect of the invention, we proceed now with a description of the remaining structure of the carburetor 12.

Carburetor 12 includes, in addition to the cyclonic flow inductor 14, an atomizing fuel injection nozzle 54 which is coaxially mounted in the outer end of the inlet chamber 28 of the cyclonic flow inductor. This nozzle includes a body with a rear cylindrical end 56 which seats against the end wall 32 of the inlet chamber 28 and a forward, conically tapered tip 58 which projects axially through the region encompassed by the tangential inlets 36 to the inlet chamber 28. Accordingly, air entering through the inlets 36 impinges the tip 58 of the nozzle 54 and is diverted axially through the chamber toward the outlet chamber 18. The atomizing nozzle 54 is identical to the atomizing nozzles embodied in the carburetors of my aforementioned copending application. Accordingly, the nozzle 54 will not be described in detail herein. Suffice it to say that the nozzle includes a fuel inlet 60, an atomizing air inlet 62, a coaxial, atomized fuel outlet orifice 64 in the extreme end of the nozzle tip 58, a fuel metering needle valve 66 axially movable in the nozzle to regulate the flow of atomized fuel through the orifice 64, and means including a pivoted arm 68 for axially positioning the needle valve 66. Fuel is delivered to the fuel inlet 60 of the atomizing nozzle 54 through a fuel line 70. Atomizing air under pressure is delivered to the atomizing air inlet of the nozzle through an air line 72. Insofar as this invention is concerned, the systems which are employed to supply fuel to the fuel line 70 and air to the air line 72 are immaterial. In actual practice, however, fuel and air are preferably supplied by fuel and air supply systems of the kind disclosed either in my aforementioned copending application or in my copending application Ser. No. 490,823, filed Sept. 28, 1965, and entitled, Carburetor.

When the cyclonic flow inductor 14 is used in the carburetor 12 under discussion, the outer open or intake end of the intake duct 43 of the inductor is radially enlarged to form an air cleaner housing 74 which opens to atmosphere. Removably mounted in this air cleaner housing is an air cleaner 76. Accordingly, air enters the carburetor through the air filter 76 which is effective to remove foreign matter from the air. A choke valve 78 is pivotally mounted in the intake duct 43 between the air filter 76 and the intake housing 38. One unique feature of the illustrated carburetor resides in the fact that the axis 48 of the inlet chamber 28 and the axis 80 of the intake duct 43 are disposed in a plane normal to the axis 50 of the outlet chamber 18. The advantage derived by this arrangement will be explained presently.

Carburetor 12 is equipped with an outer wall or jacket 82 which surrounds the major portion of the inlet chamber 28 of the cyclonic flow inductor 14 and the entire outlet chamber 18. This jacket is spaced from the wall of the inductor to define therebetween an annular flow passage 84 including a flow space 86 about the outlet chamber 18 and a flow space 88 about the inlet chamber 28. This flow passage has an inlet 90 opening to the flow space 88 and an outlet 92 opening from the flow space 86. Connected to the inlet 90 is a tube 94 which connects to the exhaust manifold 96 of the engine 10 for conveying hot exhaust gas from the engine to the flow passage 84. Mounted in the outlet 92 from the flow passage is a thermostatically controlled valve 98 which is responsive to the temperature of the exhaust gas in the passage, and more specifically to the temperature of the exhaust gas emerging from the passage. The exhaust gas which flows through the passage 84 is effective to heat the wall of the cyclonic flow inductor 14. As will be explained presently, the wall of the inductor is thus heated to vaporize liquid fuel which contacts the wall. The valve 98 regulates the exhaust gas flow through the passage 84 in such manner as to maintain the wall of the inductor at the proper temperature for optimum engine operation. The exhaust gas emerging from the valve 98 may be exhausted directly to atmosphere or may be returned to the engine exhaust system.

Mounted on the outer jacket 82 of the carburetor 12, in surrounding relation to the outlet 26 from the outlet chamber 18, is a mounting flange 100. This mounting flange is adapted for attachment to the existing carburetor mounting flange 102 on the intake manifold 104 of the engine 10. It is to this mounting flange 102 that the standard carburetor is attached. Accordingly, when installing the present improved carburetor on the engine 10, the existing carburetor is removed and the mounting flange 100 of the present carburetor is bolted to the carburetor mounting flange 102 on the engine. Accordingly, no modification of the engine is required when installing the present improved carburetor.

Pivotally mounted in the outlet opening 26 from the outlet chamber 46 is a throttle valve 108. This throttle valve is mounted on a shaft 110 which extends to the exterior of the carburetor 12 and mounts an arm 112. The outer end of the operating arm 68 for the needle valve 66 in the atomizing fuel injection nozzle 54 and the outer end of the arm 112 from the throttle valve shaft 110 are pivotally interconnected by a link 114. The throttle valve 112, in turn, is pivotally connected to one end of a throttle link 116 (FIG. 3) which is operated by the accelerator pedal (not shown) for the engine 10. It is apparent, therefore, that operation of the throttle pedal simultaneously positions the needle valve 66 in the atomizing fuel nozzle 54 and the throttle valve 108. The linkage 68, 112, 114 which interconnects the needle valve of the fuel injection nozzle and the throttle valve is so arranged that the fuel which is injected into the induction air is metered in relation to the throttle setting in such a way as to attain a predetermined air-fuel ratio for each throttle setting. Since this relationship is not material to the present invention, and is discussed in my aforementioned copending application Ser. No. 345,881, it will not be discussed in detail here.

Experiments with the present fuel atomizing carburetor have shown that best overall efficiency in the control of unburned hydrocarbons, carbon monoxide, and nitrogen oxides can be obtained if the air-fuel ratio of the combustible mixture is kept nearly constant for practically all positions of the throttle valve. This means that, as the driver progressively opens the throttle of the carburetor, the air-fuel ratio should not be subject to variations because of irregular flow characteristics of the gases passing through the throttle valve.

The conventional throttle valve consists of a plate mounted on a shaft. Such valve, when closed, fits snugly into the barrel of the carburetor. The sharp edges of the valve, however, cause flow separation and turbulence which vary in magnitude as the valve is progressively opened. Consequently, the amount of gas passing through such a valve is a complex function of the valve's angular position. It would be very difficult to match such complex flow function by a corresponding flow function of the needle valve in the fuel atomizing nozzle in order to maintain constant air-fuel ratio. Therefore, a streamlined shaped throttle valve as shown in FIG. 2 which effects smooth flow pattern is preferable. The amount of gas passing through this type of valve is a simple function of the valve's angular position and can easily be matched by a simple shape of needle valve in the atomizing nozzle to maintain nearly constant air-fuel ratio for any angular position of the throttle valve.

As mentioned earlier, a reduction in the nitrogen oxides present in the exhaust gas emission from an internal combustion engine is effected by recycling exhaust gas to the engine intake. To this end, the carburetor 12 is equipped with a conduit 118, one end of which opens to the intake duct 43, at a position between the air cleaner 76 and the choke valve 78. The opposite end of the conduit 118 connects to the engine exhaust manifold, whereby exhaust gas can flow from the manifold to the intake passage 44, through the conduit 118. Installed in the conduit 118 is a valve 120 having a pivoted operating arm 122. The outer end of this operating arm is connected, by a link 124, to the outer end of an arm 126 rigid on one end of the throttle shaft 110. Thus, the valve 120 is operated in response to operation of the throttle valve 108. The reason for the exhaust recycling valve 120 is discussed in detail in my aforementioned copending application Ser. No. 345,881 and, accordingly, will not be treated in detail here. Suffice it to say that it is desirable to cut off the flow of recycled exhaus gas to the engine when the throttle valve 108 occupies its idling and full throttle positions in order to eliminate the reduction, though slight, in engine power which accompanies the recycling of exhaust gas. To this end, the exhaust gas recycling valve 120 and its operating linkage 122, 124, 126 are designed to effect closure of the valve at the throttle settings just mentioned.

During operation of the engine 10, air is drawn into the carburetor through the intake duct 43 and enters the inlet chamber 28 of the cyclonic flow inductor 14 through the tangential inlets 36. The induction air is thereby caused to undergo simple cyclonic flow through the inlet chamber 28. Atomized fuel from the fuel injection nozzle 54 is introduced into this swirling mass of induction air to form an air-fuel mixture. During the periods of exhaust gas recycling, the induction air contains exhaust gas, whereby the swirling mixture in the inlet chamber 28 comprises an air-fuel-exhaust gas mixture. A portion of the fuel injected into the induction air vaporizes immediately. The remaining portion of the injected fuel exists as minute droplets of unvaporized fuel. These fuel droplets are thown radially out against the heated wall 30 of the inlet chamber by centrifugal force and are thereby vaporized. The resulting fuel vapor is entrained in the swirling mass of the air-fuel-exhaust gas mixture. When this mixture enters the outlet chamber 18, it undergoes a compound cyclonic motion of the kind described earlier. This compound cyclonic motion of the mixture is effective to throw any remaining droplets of unvaporized fuel outwardly against the heated walls of the outlet chamber, thereby to effect substantially total vaporization of the fuel, and to cause complete homogeneous mixing of the air, fuel vapor, and exhaust gas. The mixture emerging through the outlet 26 of the carburetor to the intake manifold 104 of the engine 10 thus contains substantially no unvaporized fuel and consists of a completely homogeneous air-fuel-exhaust gas mixture. As a consequence, uniform fuel distribution to all of the engine cylinders is accomplished, with the result that the engine may be operated satisfactorily at an air-fuel ratio substantially leaner than that of stoichiometric ratio. As a consequence, substantially complete combustion occurs within the engine cylinders and the concentrations of unburned hydrocarbons and carbon monoxide in the exhaust gas emission from the engine are drastically reduced. In addition, the complete homogeneous intermixing of the recycled exhaust gas with the induction air and fuel assures uniform distribution of exhaust gas to all of the engine cylinders, thereby eliminating power surging.

While the walls of the cyclonic mixing chambers 16 and 18 of the present carburetor are heated to vaporize any liquid fuel droplets which impinge these walls, thereby to prevent unvaporized liquid fuel from flowing along the walls into the intake manifold 104, it is desirable to avoid contact of the atomized fuel spray from the fuel injection nozzle 54 immediately upon emergence of the spray from the nozzle. In other words, it is desirable to afford the atomized fuel in the spray with an opportunity to vaporize and mix with the induction air entering the inlet chamber before contact with the heated chamber wall, thus to minimize the quantity of unvaporized fuel which must be vaporized from the chamber wall. In the carburetor of my aforementioned copending application Ser. No. 345,-881, this delayed contact of the unvaporized fuel with the wall of the cyclonic mixing chamber is accomplished by providing the mixing chamber with a venturi shape corresponding approximately to the conical spray pattern of the atomized fuel emerging from the injection nozzle, thereby to avoid direct impingement of the spray against the chamber wall. In the present carburetor, delayed contact of unvaporized fuel with the wall of the inlet chamber 16, which is of generally uniform diameter, is accomplished by making the latter diameter sufficiently large in comparison to the increasing diameter of the conical fuel spray pattern from the injection nozzle as to avoid direct impingement of the spray against the chamber wall.

It is apparent from the preceding description that the present carburetor 12 is effective to substantially reduce the exhaust contaminants emitted by internal combustion engines.

As mentioned earlier and illustrated in the drawings, the lower wall 24 of the outlet chamber 18 of the cyclonic flow inductor is conically tapered and the lower end of the internal baffle 46 is spaced from this wall, thereby to provide a flow space therebetween. The downward slope of the wall 24 toward the outlet 26 promotes the gravitational flow of liquid fuel into the intake manifold 104 of the engine 10 when the engine is cold, thereby to facilitate starting of the engine when cold.

It is important to note that when the present carburetor 12 is mounted on the engine 10 in the position shown in FIG. 3, both the inlet chamber 28 and the intake duct 43 extend in horizontal planes, whereby the carburetor has a relatively low profile, compatible with the clearance between the engine and hood of a modern automobile. It is apparent, of course, that the present carburetor may be mounted in other positions on an enginge, depending upon the type of engine, that is, whether it is a V-type engine or an in-line engine.

A highly important feature of the invention resides in the fact that the present carburetor is uniquely arranged to permit its use as a single barrel carburetor, such as that illustrated in FIGS. 1–4, or as a multiple barrel carburetor, as illustrated in FIG. 5. In the multiple barrel carburetor 12' of FIG. 5, the lower wall 24' of the carburetor inductor outlet chamber 18' has six outlets 26', each containing a throttle valve 108'. These outlets and throttle valves are arranged in two parallel rows, each containing three outlets and three valves. The valves in each row are mounted on a common operating shaft 110'. The two operating shafts 110' are interconnected by means 110'a and are operatively connected to the throttle linkage 116' in such a way that all of the throttle valves 108' are positioned in unison by operation of the throttle pedal. Each of the outlets 26' connects directly to the intake port of a particular cylinder. Thus, the carburetor 12' is designed for a six cylinder engine. As is well understood in the art, such a multiple barrel carburetion system possesses several advantages, including that of greater acceleration capability. It is apparent, of course, that the carburetor may be equipped with any number of barrels.

While the invention has herein been shown and described in what is conceived to be the most practical and preferred embodiment, it is recognized that departures may be made therefrom within the scope of the invention, which is not to be limited to the details disclosed herein, but is to be accorded the full scope of the claims so as to embrace any and all equivalent devices. While the present compound cyclonic flow inductor has been disclosed herein in connection with one particular carburetion principle, it is to be understood that the inductor may be employed in carburetion systems utilizing other carburetion principles such as that employed in standard carburetors. In the case of a standard carburetion system utilizing the present compound cyclonic flow inductor, the latter forms, in effect, an extension of the inlet manifold wherein the mixing of induction air and fuel is accomplished.

I claim:

1. A liquid fuel and air carburetion process for an internal combustion engine, that comprises:
   providing a confined stream of intake air spinning cyclonically about a longitudinal spin axis;
   jetting into the spinning air stream, in the downstream direction thereof, an expanding spray of liquid fuel that is atomized by impingement by a stream of pressurized gas directed downstream along said axis, so as to mix the atomized and vaporizing liquid fuel with said spinning air stream, and thereby cause the fuel particles and vapor to participate in said spin;
   guiding the resulting confined cyclonically spinning mixture stream to turn to one side and into a circular flow path closing on itself, such that the mixture stream continues its cyclonic spin, and spins additionally around said circular flow path, the centrifugal forces developed independently by said cyclonic spin and said circular flow path spins causing remaining unvaporized liquid fuel particles to be selectively transported radially outwardly relative to said circular path;
   contacting such radially outwardly transported liquid fuel particles by an enveloping boundary surface maintained at a fuel vaporizing temperature; and
   drawing off vaporized and homogenized mixture from the mixture stream traveling around said circular flow path.

2. The subject matter of claim 1, including drawing off the vaporized and homogenized mixture from the inside of the mixture stream traveling around said circular flow path and through a discharge flow path circumscribed by the inner boundary of said circular flow path.

3. The subject matter of claim 1, including also contacting liquid fuel particles thrown outwardly by centrifugal force from the cyclonically spinning fuel stream traveling toward said circular flow path by an enveloping boundary surface at fuel vaporizing temperature.

4. A carburetor for an internal combustion engine, comprising:
   a carburetor housing having an induction air passage and fuel discharge means;
   a preliminary mixer duct for fuel and air extending substantially linearly from said induction air passage;
   a mixing chamber of generally circular transverse section having a generally circular side wall with which said mixer duct tangentially merges to tangentially introduce a mixture of fuel and air into said chamber, and having opposite end walls;
   a baffle ring mounted in an annularly spaced position inside said chamber, opposed to said circular side wall, and defining with said side wall a generally ring-shaped mixture circulation duct;
   mixture outlet means forming a mixture discharge flow passage leading from a radially inward region of said ring-shaped mixture circulation duct through one of said end walls of said chamber, and adapted for coupling to the intake manifold of an engine;
   means for imparting to induction air flow from said induction passage through said preliminary mixer duct and around said ring-shaped circulation duct a cyclonic rotation about a longitudinal axial direction line that extends substantially linearly from said induction passage axially through said preliminary mixer duct to and tangentially into and thence axially around said ring-shaped mixture circulation duct;
   said fuel discharge means comprising means for jetting an expanding pressure-gas-atomized spray of liquid fuel droplets into the cyclonically spinning air traveling down said preliminary mixer duct from a point adjacent the ingoing end of the latter; and
   a heated fluid jacket enveloping the outer periphery of said chamber.

5. The subject matter of claim 4, wherein said heated fluid jacket envelopes a large proportion of said preliminary mixer duct and of said chamber.

6. The subject matter of claim 4, wherein the circle of said baffle ring circumscribes the portion of said mixture discharge flow path extending through said one end wall of said chamber.

References Cited

UNITED STATES PATENTS

| | | | |
|---|---|---|---|
| 1,273,845 | 7/1918 | Funderburk | 261—65 |
| 1,790,812 | 2/1931 | Hall | 123—122 |
| 1,951,812 | 3/1934 | Smith | 261—79 |
| 2,018,168 | 10/1935 | Wiley | 123—122 |
| 2,047,570 | 7/1936 | Wiltshire | 239—405 |
| 2,068,459 | 1/1937 | Monaghan | 55—459 X |
| 2,096,407 | 10/1937 | Reitmeyer | 261—79 X |
| 2,212,052 | 8/1940 | Schultz | 239—402 |
| 2,655,356 | 10/1953 | Borcherts | 261—79 X |
| 3,231,249 | 1/1966 | Kalert. | |

HARRY B. THORNTON, *Primary Examiner.*

RONALD R. WEAVER, *Examiner.*